(12) United States Patent
Huang et al.

(10) Patent No.: US 10,509,551 B2
(45) Date of Patent: Dec. 17, 2019

(54) ICON MANAGEMENT METHOD, APPARATUS, AND TERMINAL

(71) Applicant: Huawei Technologies Co., Ltd., Shenzhen (CN)

(72) Inventors: Xi Huang, Shenzhen (CN); Zhu Liu, Shenzhen (CN); Zhenwei Shan, Shenzhen (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 15/526,833

(22) PCT Filed: Jul. 29, 2015

(86) PCT No.: PCT/CN2015/085438
§ 371 (c)(1),
(2) Date: May 15, 2017

(87) PCT Pub. No.: WO2016/078441
PCT Pub. Date: May 26, 2016

(65) Prior Publication Data
US 2017/0322708 A1 Nov. 9, 2017

(30) Foreign Application Priority Data
Nov. 18, 2014 (CN) .......................... 2017 1 0657871

(51) Int. Cl.
*G06F 3/0481* (2013.01)
*G06F 3/0484* (2013.01)
(Continued)

(52) U.S. Cl.
CPC ........ *G06F 3/04845* (2013.01); *G06F 3/0482* (2013.01); *G06F 3/04817* (2013.01); *G06F 3/04842* (2013.01); *G06F 3/04883* (2013.01)

(58) Field of Classification Search
CPC .............. G06F 3/04845; G06F 3/0482; G06F 3/04817; G06F 3/04883
See application file for complete search history.

(56) References Cited

U.S. PATENT DOCUMENTS 6,469,722 B1 10/2002 Kinoe et al.
8,704,775 B2 4/2014 Cantrell
(Continued)

FOREIGN PATENT DOCUMENTS

CN 1980348 A 6/2007
CN 101344848 A 1/2009
(Continued)

OTHER PUBLICATIONS

Machine Translation and Abstract of Chinese Publication No. CN102662590, Sep. 12, 2012, 12 pages.
(Continued)

*Primary Examiner* — Seth A Silverman
(74) *Attorney, Agent, or Firm* — Conley Rose, P.C.

(57) ABSTRACT

An icon management method, apparatus, and terminal, which relate to the field of electronic devices are provided. The method includes displaying a home screen, where the home screen includes at least one target icon with at least two non-overlapping function regions. The function regions correspond to different functions, and the functions are icon adjustment functions. The method also includes receiving a first user instruction, determining a target icon selected by the first user instruction and a target function selected by the first user instruction. The target function is a function corresponding to a function region of the target icon that is selected by the first user instruction. The method also includes executing the target function on the target icon selected by the first user instruction. The method may be implemented on a terminal.

20 Claims, 11 Drawing Sheets

(51) Int. Cl.
*G06F 3/0482* (2013.01)
*G06F 3/0488* (2013.01)

(56) References Cited

U.S. PATENT DOCUMENTS

| | | | |
|---|---|---|---|
| 2007/0136681 A1 | 6/2007 | Miller | |
| 2009/0019385 A1 | 1/2009 | Khatib et al. | |
| 2009/0217206 A1* | 8/2009 | Liu | G06F 3/0481 715/846 |
| 2010/0093400 A1* | 4/2010 | Ju | G06F 3/04817 455/566 |
| 2010/0216448 A1* | 8/2010 | Jeon | G06F 3/04817 455/418 |
| 2013/0174069 A1* | 7/2013 | Lee | G06F 3/04883 715/769 |
| 2013/0332881 A1 | 12/2013 | Yook et al. | |

FOREIGN PATENT DOCUMENTS

| | | | |
|---|---|---|---|
| CN | 102662590 | A | 9/2012 |
| CN | 103577082 | A | 2/2014 |
| CN | 103970426 | A | 8/2014 |
| CN | 104094210 | A | 10/2014 |
| EP | 3076275 | A1 | 10/2016 |
| WO | 2014070221 | A1 | 5/2014 |

OTHER PUBLICATIONS

Machine Translation and Abstract of Chinese Publication No. CN103970426, Aug. 6, 2014, 13 pages.
Foreign Communication From a Counterpart Application, Chinese Application No. 201410657871.0, Chinese Office Action dated Apr. 28, 2018, 9 pages.
Foreign Communication From a Counterpart Application, European Application No. 15860278.9, Extended European Search Report dated Oct. 20, 2017, 9 pages.
Machine Translation and Abstract of Chinese Publication No. CN103577082, Feb. 12, 2014, 15 pages.
Foreign Communication From a Counterpart Application, PCT Application No. PCT/CN2015/085438, English Translations of International Search Report dated Oct. 30, 2015, 2 pages.
Foreign Communication From a Counterpart Application, PCT Application No. PCT/CN2015/085438, English Translations of Written Opinion dated Oct. 30, 2015, 5 pages.
Pogue, D., "iPhone: The Missing Manual, Fourth Edition" XP055042248, Aug. 24, 2010, 57 pages.
Foreign Communication From a Counterpart Application, European Application No. 15860278.9, European Office Action dated Oct. 8, 2019, 10 pages.

\* cited by examiner

ICON MANAGEMENT METHOD, APPARATUS, AND TERMINAL

This application is a US National Stage application of International Patent Application No. PCT/CN2015/085438, filed on Jul. 29, 2015, which claims priority to Chinese Patent Application No. 201410657871.0, filed with the Chinese Patent Office on Nov. 18, 2014. The disclosures of the aforementioned applications are hereby incorporated by reference in their entireties.

TECHNICAL FIELD

The disclosure relates to the field of electronic device technologies, and in particular, to an icon management method, apparatus, and terminal.

BACKGROUND

Currently, a user uses increasingly more terminal products, including a mobile phone. When using a terminal, the user usually needs to adjust an icon displayed on a home screen of the terminal, namely, the so-called home interface. For example, the user adjusts a position of an icon, or combines icons. In the prior art, a terminal adjusts an icon in the following manner: when a user needs to adjust a position of an icon, after the terminal enters an icon editing mode, the user holds and drags the icon to a target position, and the terminal moves, according to the operation of the user, the icon held by the user to the target position. Alternatively, when the user needs to combine icons, after the terminal enters the icon editing mode, the user holds and drags an icon to a target icon, and the terminal combines, according to the operation of the user, the icon held by the user with the target icon.

At least the following problems exist in the prior art: a terminal adjusts an icon according to an operation of a user. However, some icon adjustment operations are similar. For example, icon position adjustment and icon combination are both implemented by holding and dragging an icon by a user. When a user executes an operation to adjust an icon, the terminal may incorrectly adjust the icon because of an inaccurate operation or a misoperation. For example, in a process of adjusting a position of an icon, a user drags the icon to an icon near a target position, and the terminal combines, according to the operation of the user, the icon held by the user with the icon near the target position instead of moving the icon to the target position. As a result, a misoperation of the terminal is caused, which not only wastes time of the user, but also lowers icon adjustment accuracy.

SUMMARY

Embodiments of the disclosure provide an icon management method, apparatus, and terminal, which can resolve a problem of low icon adjustment accuracy caused by a misoperation that usually occurs when the terminal adjusts an icon according to an operation of a user.

To achieve the foregoing objective, the following technical solutions are used in the embodiments of the disclosure.

According to a first aspect, an embodiment of the disclosure provides an icon management method, including displaying a home screen, where the home screen includes at least one target icon, the target icon has at least two non-overlapping function regions, the function regions are corresponding to different functions, and the functions are icon adjustment functions; receiving a first user instruction; determining a target icon selected by the first user instruction and a target function selected by the first user instruction, where the target function is a function corresponding to a function region of the target icon selected by the first user instruction; and executing the target function on the target icon selected by the first user instruction.

With reference to the first aspect, in a first possible implementation manner of the first aspect, before executing the target function on the target icon selected by the first user instruction, the method further includes modifying a display manner of the target icon on the home screen according to the target function, so as to prompt that the target function is activated.

With reference to the first possible implementation manner of the first aspect, in a second possible implementation manner of the first aspect, the target function is combining an icon or entering an icon combination mode, and modifying a display manner of the target icon on the home screen according to the target function includes modifying a shape of the target icon on the home screen to a specific shape.

With reference to the first possible implementation manner of the first aspect, in a third possible implementation manner of the first aspect, the target function is adjusting a position of an icon or entering an icon position adjustment mode, and modifying a display manner of the target icon on the home screen according to the target function includes dithering the target icon on the home screen.

With reference to the third possible implementation manner of the first aspect, in a fourth possible implementation manner of the first aspect, the target function is entering the icon position adjustment mode, and after executing the target function on the target icon selected by the first user instruction, the method further includes receiving a second user instruction; and executing a position adjustment function on a target icon selected by the second user instruction.

With reference to the third possible implementation manner of the first aspect or the fourth possible implementation manner of the first aspect, in a fifth possible implementation manner of the first aspect, after executing a position adjustment function on a target icon selected by the second user instruction, the method further includes stopping dithering the target icon on the home screen.

With reference to the second possible implementation manner of the first aspect, in a sixth possible implementation manner of the first aspect, the target function is an operation of entering the icon combination mode, and after executing the target function on the target icon selected by the first user instruction, the method further includes receiving a second user instruction; and executing an icon combination function on a target icon selected by the second user instruction.

With reference to the second possible implementation manner of the first aspect or the sixth possible implementation manner of the first aspect, in a seventh possible implementation manner of the first aspect, after executing an icon combination function on a target icon selected by the second user instruction, the method further includes restoring the shape of the target icon on the home screen.

With reference to any one of the foregoing possible implementation manners of the first aspect, in an eighth possible implementation manner of the first aspect, determining a target function selected by the first user instruction includes determining, when a moment of receiving the first user instruction is in a different time period, that a different target function is selected by the first user instruction; or determining, when the target icon selected by the first user instruction is in a different position, that a different target function is selected by the first user instruction; or determining, when a type of the target icon selected by the first user instruction is a different type, that a different target function is selected by the first user instruction.

With reference to the eighth possible implementation manner of the first aspect, in a ninth possible implementation manner of the first aspect, determining, when a moment of receiving the first user instruction is in a different time period, that a different target function is selected by the first user instruction includes, if the moment of receiving the first user instruction is in a first time period, determining that the target function selected by the first user instruction is a first function; or if the moment of receiving the first user instruction is in a second time period, determining that the target function selected by the first user instruction is a second function, where the first time period is different from the second time period, and the first function and the second function belong to the functions.

With reference to the eighth possible implementation manner of the first aspect, in a tenth possible implementation manner of the first aspect, determining, when the target icon selected by the first user instruction is in a different position, that a different target function is selected by the first user instruction includes, if the target icon selected by the first user instruction is in a first position, determining that the target function selected by the first user instruction is a first function; or if the target icon selected by the first user instruction is in a first position, determining that the target function selected by the first user instruction is a second function, where the first position is different from the second position, and the first function and the second function belong to the functions.

With reference to the eighth possible implementation manner of the first aspect, in an eleventh possible implementation manner of the first aspect, determining, when a type of the target icon selected by the first user instruction is a different type, that a different target function is selected by the first user instruction includes, if the type of the target icon selected by the first user instruction is a first type, determining that the target function selected by the first user instruction is a first function; or if the type of the target icon selected by the first user instruction is a second type, determining that the target function selected by the first user instruction is a second function, where the first type is different from the second type, and the first function and the second function belong to the functions.

With reference to the first aspect or any one of the foregoing possible implementation manners of the first aspect, in a twelfth possible implementation manner of the first aspect, before executing the target function on the target icon selected by the first user instruction, the method further includes, enlarging, in a position of the target icon selected by the first user instruction, the target icon selected by the first user instruction; or enlarging, in a vacant position of the home screen, the target icon selected by the first user instruction.

According to a second aspect, an embodiment of the disclosure provides an icon management apparatus, including a display unit configured to display a home screen, where the home screen includes at least one target icon, the target icon has at least two non-overlapping function regions, the function regions are corresponding to different functions, and the functions are icon adjustment functions; a receiving unit configured to receive a first user instruction; a determining unit configured to determine a target icon selected by the first user instruction and a target function selected by the first user instruction, where the target function is a function corresponding to a function region of the target icon selected by the first user instruction; and an execution unit configured to execute the target function on the target icon selected by the first user instruction.

With reference to the second aspect, in a first possible implementation manner of the second aspect, before executing the target function on the target icon selected by the first user instruction, the apparatus further includes a modification unit configured to modify a display manner of the target icon on the home screen according to the target function, so as to prompt that the target function is activated.

With reference to the first possible implementation manner of the second aspect, in a second possible implementation manner of the second aspect, the target function is combining an icon or entering an icon combination mode, and the modification unit includes a modification subunit configured to modify a shape of the target icon on the home screen to a specific shape.

With reference to the first possible implementation manner of the second aspect, in a third possible implementation manner of the second aspect, the target function is adjusting a position of an icon or entering an icon position adjustment mode, and the modification unit includes a dither subunit configured to dither the target icon on the home screen.

With reference to the third possible implementation manner of the second aspect, in a fourth possible implementation manner of the second aspect, the target function is entering the icon position adjustment mode, and after executing the target function on the target icon selected by the first user instruction, the receiving unit is further configured to receive a second user instruction; and the execution unit is further configured to execute a position adjustment function on a target icon selected by the second user instruction.

With reference to the third possible implementation manner of the second aspect or the fourth possible implementation manner of the second aspect, in a fifth possible implementation manner of the second aspect, after executing a position adjustment function on a target icon selected by the second user instruction, the apparatus further includes a stop unit configured to stop dithering the target icon on the home screen.

With reference to the second possible implementation manner of the second aspect, in a sixth possible implementation manner of the second aspect, the target function is an operation of entering the icon combination mode, and after executing the target function on the target icon selected by the first user instruction, the receiving unit is further configured to receive a second user instruction; and the execution unit is further configured to execute a position adjustment function on a target icon selected by the second user instruction.

With reference to the sixth possible implementation manner of the second aspect, in a seventh possible implementation manner of the second aspect, after executing an icon combination function on a target icon selected by the second user instruction, the apparatus further includes a restoration unit configured to restore the shape of the target icon on the home screen.

With reference to the second aspect or any one of the foregoing possible implementation manners of the second aspect, in an eighth possible implementation manner of the second aspect, the determining unit is configured to, when a moment of receiving the first user instruction is in a different time period, determine that a different target function is selected by the first user instruction; or the determining unit is configured to, when the target icon selected by the first user instruction is in a different position, determine that a different target function is selected by the first user instruction; or the determining unit is configured to, when a type of the target icon selected by the first user instruction is a different type, determine that a different target function is selected by the first user instruction.

With reference to the eighth possible implementation manner of the second aspect, in a ninth possible implementation manner of the second aspect, the determining unit is configured to, if the moment of receiving the first user instruction is in a first time period, determine that the target function selected by the first user instruction is a first function; or if the moment of receiving the first user instruction is in a second time period, determine that the target function selected by the first user instruction is a second function, where the first time period is different from the second time period, and the first function and the second function belong to the functions.

With reference to the eighth possible implementation manner of the second aspect, in a tenth possible implementation manner of the second aspect, the determining unit is configured to, if the target icon selected by the first user instruction is in a first position, determine that the target function selected by the first user instruction is a first function; or if the target icon selected by the first user instruction is in a first position, determine that the target function selected by the first user instruction is a second function, where the first position is different from the second position, and the first function and the second function belong to the functions.

With reference to the eighth possible implementation manner of the second aspect, in an eleventh possible implementation manner of the second aspect, the determining unit is configured to, if the type of the target icon selected by the first user instruction is a first type, determine that the target function selected by the first user instruction is a first function; or if the type of the target icon selected by the first user instruction is a second type, determine that the target function selected by the first user instruction is a second function, where the first type is different from the second type, and the first function and the second function belong to the functions.

With reference to the second aspect or any one of the foregoing possible implementation manners of the second aspect, in a twelfth possible implementation manner of the second aspect, before executing the target function on the target icon selected by the first user instruction, the apparatus further includes an enlargement unit configured to enlarge, in a position of the target icon selected by the first user instruction, the target icon selected by the first user instruction; or the enlargement unit is further configured to enlarge, in a vacant position of the home screen, the target icon selected by the first user instruction.

According to a third aspect, an embodiment of the disclosure provides an icon management terminal, where the terminal includes at least an input unit, a processing unit, and an output unit; where the output unit is configured to display a home screen, where the home screen includes at least one target icon, the target icon has at least two non-overlapping function regions, the function regions are corresponding to different functions, and the functions are icon adjustment functions; the input unit is configured to receive a first user instruction; and the processing unit is configured to determine a target icon selected by the first user instruction and a target function selected by the first user instruction, where the target function is a function corresponding to a function region of the target icon selected by the first user instruction; and execute the target function on the target icon selected by the first user instruction.

With reference to the third aspect, in a first possible implementation manner of the third aspect, the processing unit is further configured to, before executing the target function on the target icon selected by the first user instruction, modify a display manner of the target icon on the home screen according to the target function, so as to prompt that the target function is activated.

With reference to the first possible implementation manner of the third aspect, the target function is combining an icon or entering an icon combination mode, and modifying a display manner of the target icon on the home screen according to the target function includes modifying a shape of the target icon on the home screen to a specific shape.

With reference to the first possible implementation manner of the third aspect, in a third possible implementation manner of the third aspect, the target function is adjusting a position of an icon or entering an icon position adjustment mode, and modifying a display manner of the target icon on the home screen according to the target function includes dithering the target icon on the home screen.

With reference to the third possible implementation manner of the third aspect, in a fourth possible implementation manner of the third aspect, the target function is entering the icon position adjustment mode, and the input unit is further configured to receive a second user instruction, after executing the target function on the target icon selected by the first user instruction; and the processing unit is further configured to execute a position adjustment function on a target icon selected by the second user instruction.

With reference to the third possible implementation manner of the third aspect or the fourth possible implementation manner of the third aspect, in a fifth possible implementation manner of the third aspect, the processing unit is further configured to, after executing a position adjustment function on a target icon selected by the second user instruction, stop dithering the target icon on the home screen.

With reference to the second possible implementation manner of the third aspect, in a sixth possible implementation manner of the third aspect, the input unit is further configured to: the target function is an operation of entering the icon combination mode, and receive a second user instruction after executing the target function on the target icon selected by the first user instruction; and the processing unit is further configured to execute a position adjustment function on a target icon selected by the second user instruction.

With reference to the second possible implementation manner of the third aspect or the sixth possible implementation manner of the third aspect, in a seventh possible implementation manner of the third aspect, the processing unit is further configured to, after executing an icon combination function on a target icon selected by the second user instruction, restore the shape of the target icon on the home screen.

With reference to the third aspect or any one of the foregoing possible implementation manners of the third aspect, in an eighth possible implementation manner of the third aspect, the processing unit is further configured to determine, when a moment of receiving the first user instruction is in a different time period, that a different target function is selected by the first user instruction; or determine, when the target icon selected by the first user instruction is in a different position, that a different target function is selected by the first user instruction; or determine, when a type of the target icon selected by the first user instruction is a different type, that a different target function is selected by the first user instruction.

With reference to the eighth possible implementation manner of the third aspect, in a ninth possible implementation manner of the third aspect, determining, when a moment of receiving the first user instruction is in a different time period, that a different target function is selected by the first user instruction includes, if the moment of receiving the first user instruction is in a first time period, determining that the target function selected by the first user instruction is a first function; or if the moment of receiving the first user instruction is in a second time period, determining that the target function selected by the first user instruction is a second function, where the first time period is different from the second time period, and the first function and the second function belong to the functions.

With reference to the eighth possible implementation manner of the third aspect, in a tenth possible implementation manner of the third aspect, determining, when the target icon selected by the first user instruction is in a different position, that a different target function is selected by the first user instruction includes, if the target icon selected by the first user instruction is in a first position, determining that the target function selected by the first user instruction is a first function; or if the target icon selected by the first user instruction is in a first position, determining that the target function selected by the first user instruction is a second function, where the first position is different from the second position, and the first function and the second function belong to the functions.

With reference to the eighth possible implementation manner of the third aspect, in an eleventh possible implementation manner of the third aspect, determining, when a type of the target icon selected by the first user instruction is a different type, that a different target function is selected by the first user instruction includes, if the type of the target icon selected by the first user instruction is a first type, determining that the target function selected by the first user instruction is a first function; or if the type of the target icon selected by the first user instruction is a second type, determining that the target function selected by the first user instruction is a second function, where the first type is different from the second type, and the first function and the second function belong to the functions.

With reference to the third aspect or any one of the foregoing possible implementation manners of the third aspect, in a twelfth possible implementation manner of the third aspect, the processing unit is further configured to, before executing the target function on the target icon selected by the first user instruction, enlarge, in a position of the target icon selected by the first user instruction, the target icon selected by the first user instruction; or enlarge, in a vacant position of the home screen, the target icon selected by the first user instruction.

In the prior art, a terminal adjusts an icon according to an operation of a user. However, some icon adjustment operations are similar. When a user executes an operation to adjust an icon, the terminal may incorrectly adjust the icon because of a misoperation, which not only wastes time of the user, but also lowers icon management accuracy. Compared with the prior art, according to the icon management method, apparatus, and terminal that are provided in the embodiments of the disclosure, the terminal in the disclosure displays a home screen that includes at least one target icon, where the target icon has at least two non-overlapping function regions, and the function regions are corresponding to different icon adjustment functions; receives a first user instruction; determines a target icon selected by the first user instruction and a target function selected by the first user instruction, where the target function is a function corresponding to a function region of the target icon selected by the first user instruction; and executes the target function on the target icon selected by the first user instruction. In this way, the target icon on the home screen of the terminal includes at least two non-overlapping function regions, where the function regions are corresponding to different functions. When a user adjusts a target icon on the home screen, the terminal receives a user instruction for performing an operation on the target icon on the home screen from the user; determines, according to the user instruction, the target icon selected by the user and a function region of the target icon selected by the user; determines, according to the function region selected by the user and a function corresponding to the function region, a target function selected by the user; and executes the target function on the target icon selected by the user. Because the terminal executes only adjustment consistent with the target function on the target icon after determining the target function, the terminal executes no adjustment inconsistent with the target function on the target function, which reduces a misoperation that occurs when the terminal adjusts an icon, and improves icon adjustment accuracy.

BRIEF DESCRIPTION OF DRAWINGS

To describe the technical solutions in the embodiments of the disclosure more clearly, the following briefly describes the accompanying drawings used for describing the embodiments. The accompanying drawings in the following description show merely some embodiments of the disclosure, and a person of ordinary skill in the art may still derive other drawings from these accompanying drawings without creative efforts.

DESCRIPTION OF EMBODIMENTS

The following clearly and completely describes the technical solutions in the embodiments of the disclosure with reference to the accompanying drawings in the embodiments of the disclosure. The described embodiments are merely some but not all of the embodiments of the disclosure. All other embodiments obtained by a person of ordinary skill in the art based on the embodiments of the disclosure without creative efforts shall fall within the protection scope of the disclosure.

It should be noted that multiple operations that appear in a specific sequence are included in some procedures described below, but it should be clearly understood that these operations may be executed not in the sequence that these operations appear in this specification or be executed concurrently. Operating sequence numbers such as 201 and 202 are merely used to distinguish between different operations, and a sequence number itself does not represent any execution sequence. In addition, these procedures may include more or fewer operations, and these operations may be executed in a sequence or be executed concurrently.

It should be noted that descriptions such as "first" and "second" in this specification are used to distinguish between different information, devices, modules, and the like, and do not represent a sequence, and this specification also imposes no limitation on that "first" and "second" are of different types. "When" in this specification represents meeting a condition or a state, and includes meanings such as "if", "after a condition is met", and "a determining is valid".

Figure 1:
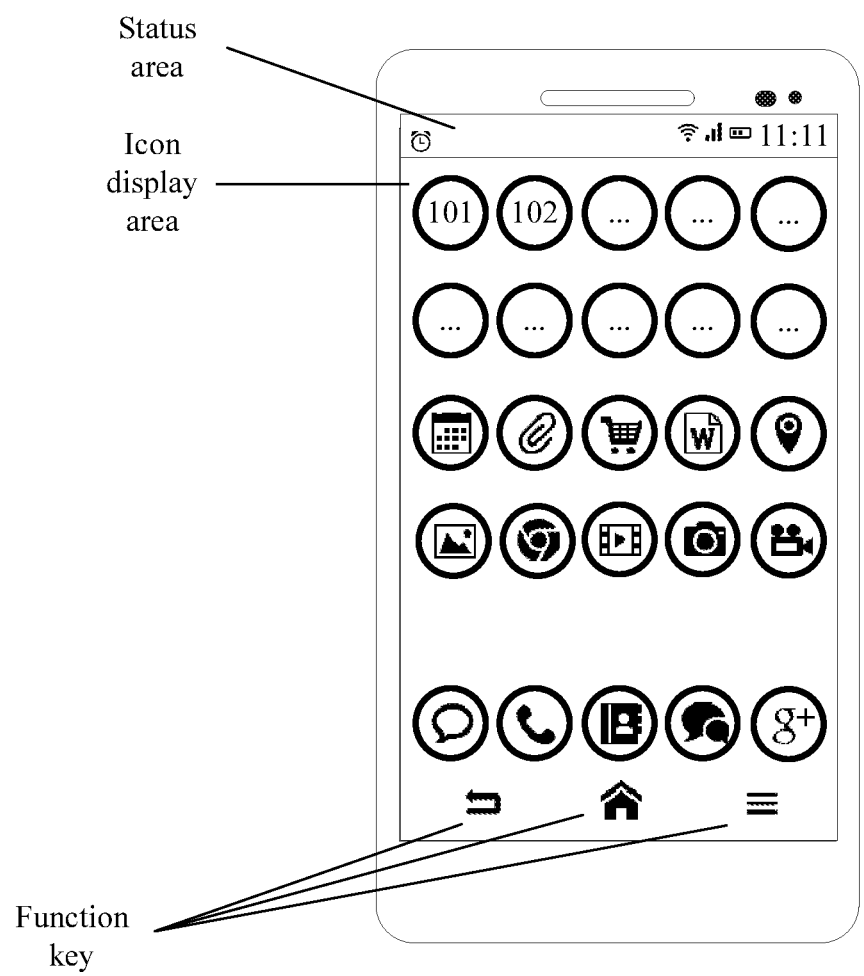
FIG. 1 is a schematic diagram of a home screen according to the disclosure.

The disclosure is applicable to icon management by a terminal. As shown in FIG. 1, FIG. 1 is a home screen of some terminals. The home screen includes a status area and an icon display area. The status area is used to display some states of a terminal such as a power state, an alarm clock state, signal strength of terminal wireless communication (for example, Wireless-Fidelity (Wi-Fi), time, and signal strength of an operator network. The status area is not an application object of the method of the disclosure, and details are not described herein. The icon display area includes multiple icons in a same shape as an icon 101 and three function keys in a lower part. A function key is not an application object of the method of the disclosure, and details are not described herein. The multiple icons in the same icon shape as the icon 101 are application objects of the method of the disclosure, that is, target icons. Meanings represented by these icons are not limited. These icons may represent one or more functions, for example, a camera or image management, or may represent one or more applications, for example, an electronic book (e-book) reader or a browser, or may represent a folder that includes multiple functions, or the like. A shape, a size, an arrangement sequence, or the like of an icon on the home screen shown in FIG. 1 is merely one type of icon display on the home screen. In addition to this type of icon display, there may be multiple display manners for an icon on a home screen of a terminal, which is not limited herein.

In the embodiments of the disclosure, a user may select one or more icons by using one or more fingers or one or more styluses or the like to contact with a home screen. When the user releases contact with one or more icons, the one or more icons are selected. The contact may include a gesture, for example, tapping an icon on the home screen by one or more fingers, one or more swipes (for example, from left to right, from right to left, upward, and/or downward), and/or scrolling (for example, from right to left, from left to right, upward, and/or downward) an icon on the home screen. Unintentional contact with an icon does not result in icon selection.

Figure 2:
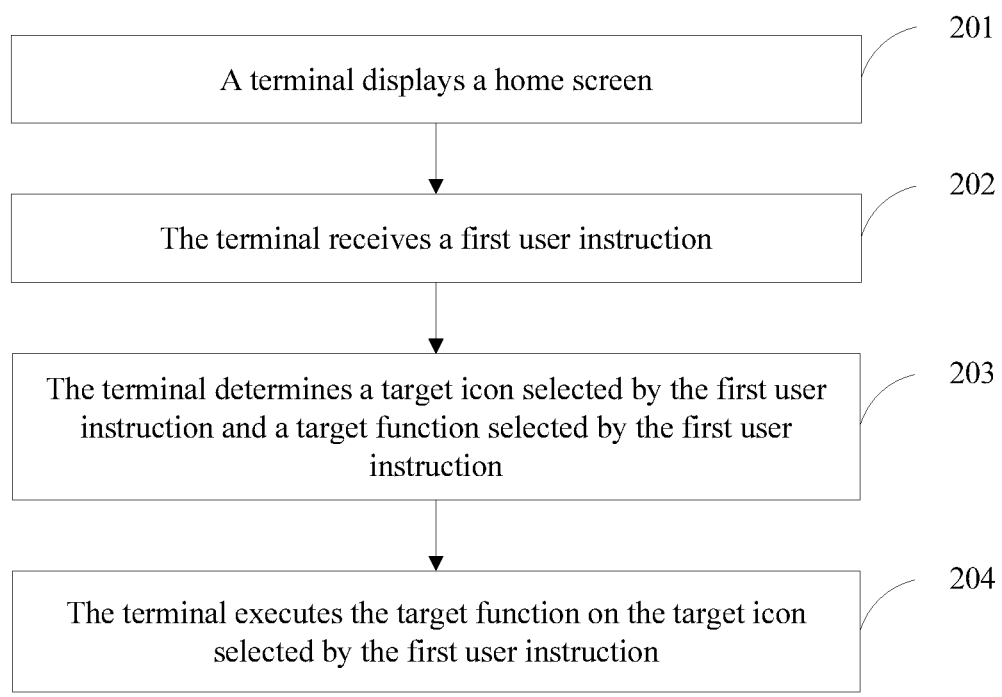
FIG. 2 is a flowchart of a method according to an embodiment of the disclosure.

An embodiment of the disclosure provides an icon management method. The method is applied to a terminal when a user needs to manage a target icon on a home screen of the terminal. As shown in FIG. 2, the method includes the following steps:

201: The terminal displays the home screen.

The home screen includes at least one target icon, the target icon has at least two non-overlapping function regions, the function regions are corresponding to different functions, and the functions are icon adjustment functions.

Figure 3:
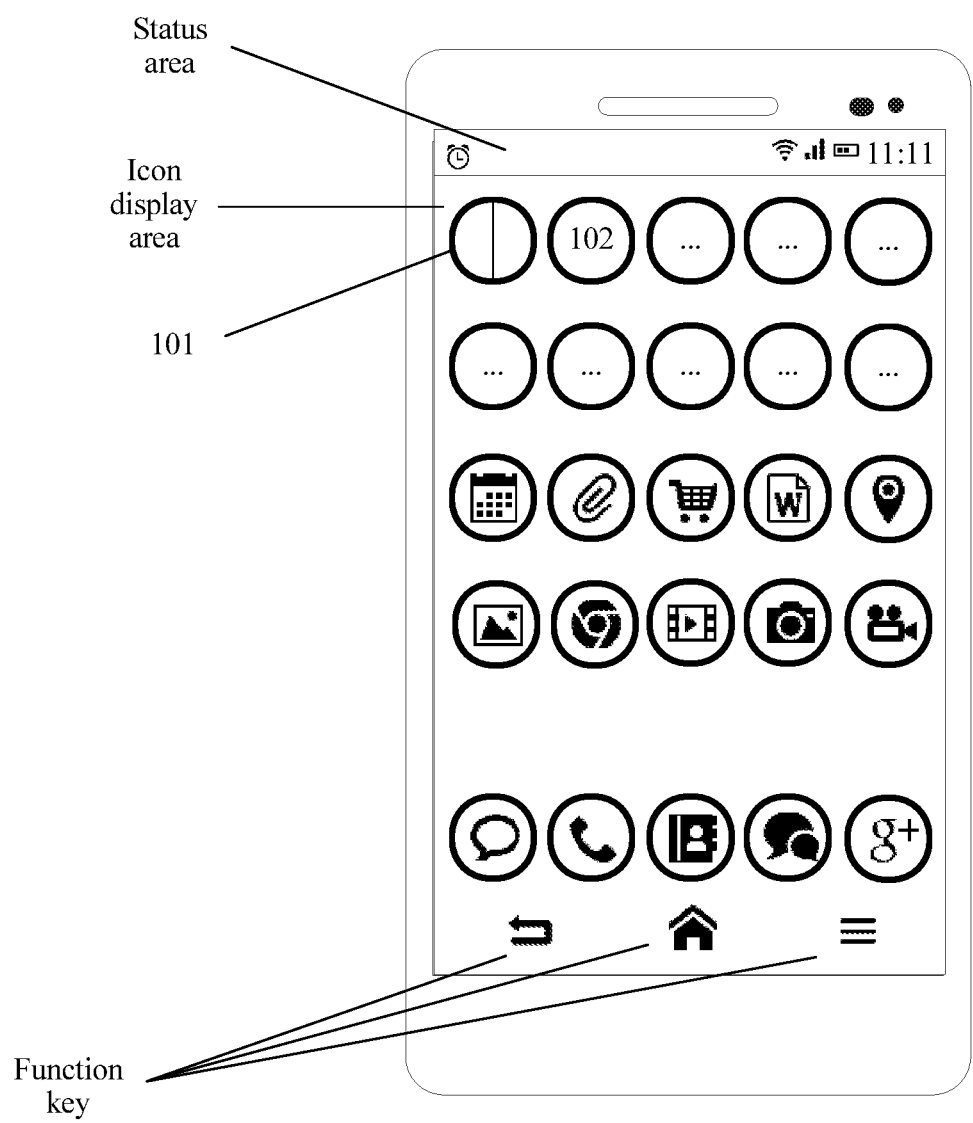
FIG. 3 is a schematic diagram of a function region of an icon according to still another embodiment of the disclosure.

It should be noted that the terminal divides a target icon into at least two non-overlapping regions. Because the non-overlapping regions are corresponding to different functions, the non-overlapping regions are referred to as function regions. The home screen shown in FIG. 1 is used as an example. The target icon 101 on the home screen shown in FIG. 1 has two function regions with a same size on the left and right. As shown in FIG. 3, this embodiment of the disclosure imposes no limitation on a quantity and a shape of function regions of a target icon. FIG. 3 is merely one type. A function corresponding to a function region is a function used for icon adjustment, for example, combining an icon, adjusting a position of an icon, entering an icon combination mode, or entering an icon position adjustment mode.

202: The terminal receives a first user instruction.

The first user instruction is an operation performed by a user on the target icon on the home screen.

203: The terminal determines a target icon selected by the first user instruction and a target function selected by the first user instruction.

The target function is a function corresponding to a function region of the target icon selected by the first user instruction.

It should be noted that a target icon on which the first user instruction is operated is the target icon selected by the first user instruction, and a function corresponding to a function region selected when the user performs an operation on the target icon by using the first user instruction is the target function. For example, as shown in FIG. 3, a function corresponding to the left function region of the target icon 101 is combining the icon, a function corresponding to the right function region is adjusting a position of the icon, and the first user instruction is to select the left function region of the target icon 101 and drag the target icon 101 to a position near or over the target icon 102. In this case, the terminal determines, according to the received first user instruction, that the target icon selected by the first user instruction is the icon 101 and the target icon 102, and the target function selected by the first user instruction is combining the icon.

204: The terminal executes the target function on the target icon selected by the first user instruction.

The target function may be combining an icon, adjusting a position of an icon, entering an icon combination mode, entering an icon position adjustment mode, or the like. After determining the target function selected by the first user instruction, the terminal executes the target function on the target icon selected by the first user instruction. For example, the first user instruction is to select the left function region of the target icon 101 (in this case, the function corresponding to the left function region is combining the icon) and drag the target icon 101 to a position near or over the target icon 102. Then, the terminal determines that the icon selected by the first user instruction is 101 and the target icon 102, and the selected target function is combining the icon. In this case, the terminal executes the target function, that is, creates a folder that includes the target icon 101 and the target icon 102. For another example, the first user instruction is to tap the left function region of the target icon 101. In this case, the function corresponding to the left function region is entering an icon combination mode. The terminal determines that the target icon selected by the first user instruction is the target icon 101, and the selected target function is entering the icon combination mode. The terminal executes the target function, that is, the target icon 101 enters the icon combination mode. In this case, the terminal further needs to receive another instruction subsequently to complete combination of the target icon 101. On another aspect, the terminal executes the target function, and when the target icon 101 enters the icon combination mode, another target icon on the home screen of the terminal also enters the icon combination mode. In this case, the terminal may subsequently receive another instruction to execute an icon combination function on all icons on the home screen.

Optionally, after determining the target function in step 203, the terminal may prompt the user, in a manner of changing a display manner of the target icon, that the target function has been triggered. Therefore, before step 204 shown in FIG. 2, the terminal may further modify the display manner of the target icon on the home screen according to the target function.

The display manner of the target icon may be a shape, a size, a color, or the like of the icon, and is not limited herein.

Specifically, the target function is combining the icon or entering the icon combination mode, and that the terminal modifies the display manner of the target icon on the home screen according to the target function may be modifying a shape of the target icon on the home screen to a specific shape. Alternatively, the target function is adjusting the position of the icon or entering the icon position adjustment mode, and the terminal modifies the display manner of the target icon on the home screen according to the target function by dithering the target icon on the home screen.

Optionally, the target function is entering the icon combination mode, and the terminal may further receive a second user instruction, and executes an icon combination function on a target icon selected by the second user instruction. Alternatively, the target function is entering the icon position adjustment mode, and the terminal may further receive a second user instruction, and executes a position adjustment function on a target icon selected by the second user instruction, so as to complete target icon adjustment of the target icon.

For example, when the target function is entering the icon combination mode, after entering the icon combination mode, the terminal receives the second user instruction, that is, moves the target icon 101 on the home screen over the target icon 102, and then the terminal creates a folder that includes the target icon 101 and the target icon 102. When the target function is entering the icon position adjustment mode, after entering the icon position adjustment mode, the terminal receives the second user instruction, that is, moves the target icon 101 on the home screen over the target icon 102, and then the terminal adjusts a position of the target icon 101 and a position of the target icon 102.

Optionally, if the terminal modifies the display manner of the target icon on the home screen before step 204, after completing the target icon adjustment, the terminal may further restore the display manner of the target icon on the home screen to an original manner.

Specifically, when the target function is entering the icon combination mode, after the terminal executes the icon combination function on the target icon selected by the second user instruction, the terminal may further restore the shape of the target icon on the home screen. When the target function is entering the icon position adjustment mode, after executing icon position adjustment on the target icon selected by the second user instruction, the terminal stops dithering the target icon on the home screen. When the target function is combining the icon, after the terminal executes the target function on the target icon selected by the first user instruction, the terminal may further restore the shape of the target icon on the home screen. When the target function is adjusting the position of the icon, after the terminal executes the target function on the target icon selected by the first user instruction, the terminal may further stop dithering the target icon on the home screen.

Optionally, a function region of a target icon may not only be corresponding to one function, but also be corresponding to at least two functions, so that a user may select a different target function in a different scenario by using the function region, thereby facilitating icon adjustment performed by the user. A manner in which a function region is corresponding to at least two functions may be as follows: the function region is circularly corresponding to the at least two functions according to a preset time; or the function region is corresponding to a different function according to a different position; or the function region is corresponding to a different function according to a different icon type. Further, the function region is circularly corresponding to at least two functions according to a preset time, and when a moment of receiving the first user instruction by the terminal is in a different time period, the terminal determines that a different target function is selected by the first user instruction; or the function region is corresponding to a different function according to a different position, and when the target icon selected by the first user instruction is in a different position, the terminal determines that a different target function is selected by the first user instruction; or the function region is corresponding to a different function according to a different icon type, and when a type of the target icon selected by the first user instruction is a different type, the terminal determines that a different target function is selected by the first user instruction.

For example, a function region is corresponding to three functions, which are A, B, and C respectively. A correspondence between the function region and the three functions may be preset so that the correspondence between the function region and the three functions is updated every five minutes, and an update sequence is A, B, and C. In this case, the correspondence between the function region and the three functions is updated every five minutes according to the sequence A, B, and C. For another example, a function region is corresponding to three functions, which are A, B, and C respectively. A mobile phone may count times that a user uses the three functions in a time period, and determine a correspondence between the function region and the three functions according to the counted times. For another example, a function region is corresponding to three functions, which are A, B, and C respectively. When an icon locates in an upper left corner of the home screen, the function region is corresponding to the function A. When an icon locates in an upper right corner of the home screen, the function region is corresponding to the function B. When an icon is not adjacent to any other icon on the screen, the function region is corresponding to the function C. For another example, a type of an icon is "game type", and a function region of the icon is corresponding to two functions: folder combination and icon position adjustment. When a game type application folder already exists on the home screen, a function corresponding to the function region is folder combination. When no game type application folder exists on the home screen, a function corresponding to the function region is icon position adjustment.

Optionally, before executing the target function on the target icon selected by the first user instruction, the terminal may further enlarge the target icon selected by the first user instruction, so that it is convenient for the user to perform an operation on the target icon selected by the first user instruction. An enlargement manner may be enlarging, in a position of the target icon selected by the first user instruction, the target icon selected by the first user instruction, or enlarging, in a vacant position of the home screen, the target icon selected by the first user instruction.

In the prior art, a terminal adjusts an icon according to an operation of a user. However, some icon adjustment operations are similar. When a user executes an operation to adjust an icon, the terminal may incorrectly adjust the icon because of a misoperation, which not only wastes time of the user, but also lowers icon adjustment accuracy. Compared with the prior art, the terminal in the disclosure displays a home screen that includes at least one target icon, where the target icon has at least two non-overlapping function regions, and the function regions are corresponding to different icon adjustment functions; receives a first user instruction; determines a target icon selected by the first user instruction and a target function selected by the first user instruction, where the target function is a function corresponding to a function region of the target icon selected by the first user instruction; and executes the target function on the target icon selected by the first user instruction. In this way, the target icon on the home screen of the terminal includes at least two non-overlapping function regions, where the function regions are corresponding to different functions. When a user adjusts a target icon on the home screen, the terminal receives a user instruction for performing an operation on the target icon on the home screen from the user; determines, according to the user instruction, the target icon selected by the user and a function region of the target icon selected by the user; determines, according to the function region selected by the user and a function corresponding to the function region, a target function selected by the user; and executes the target function on the target icon selected by the user. Because the terminal executes only adjustment consistent with the target function on the target icon after determining the target function, the terminal executes no adjustment inconsistent with the target function on the target function, which reduces a misoperation that occurs when the terminal adjusts an icon, and improves icon adjustment accuracy.

Figure 4:
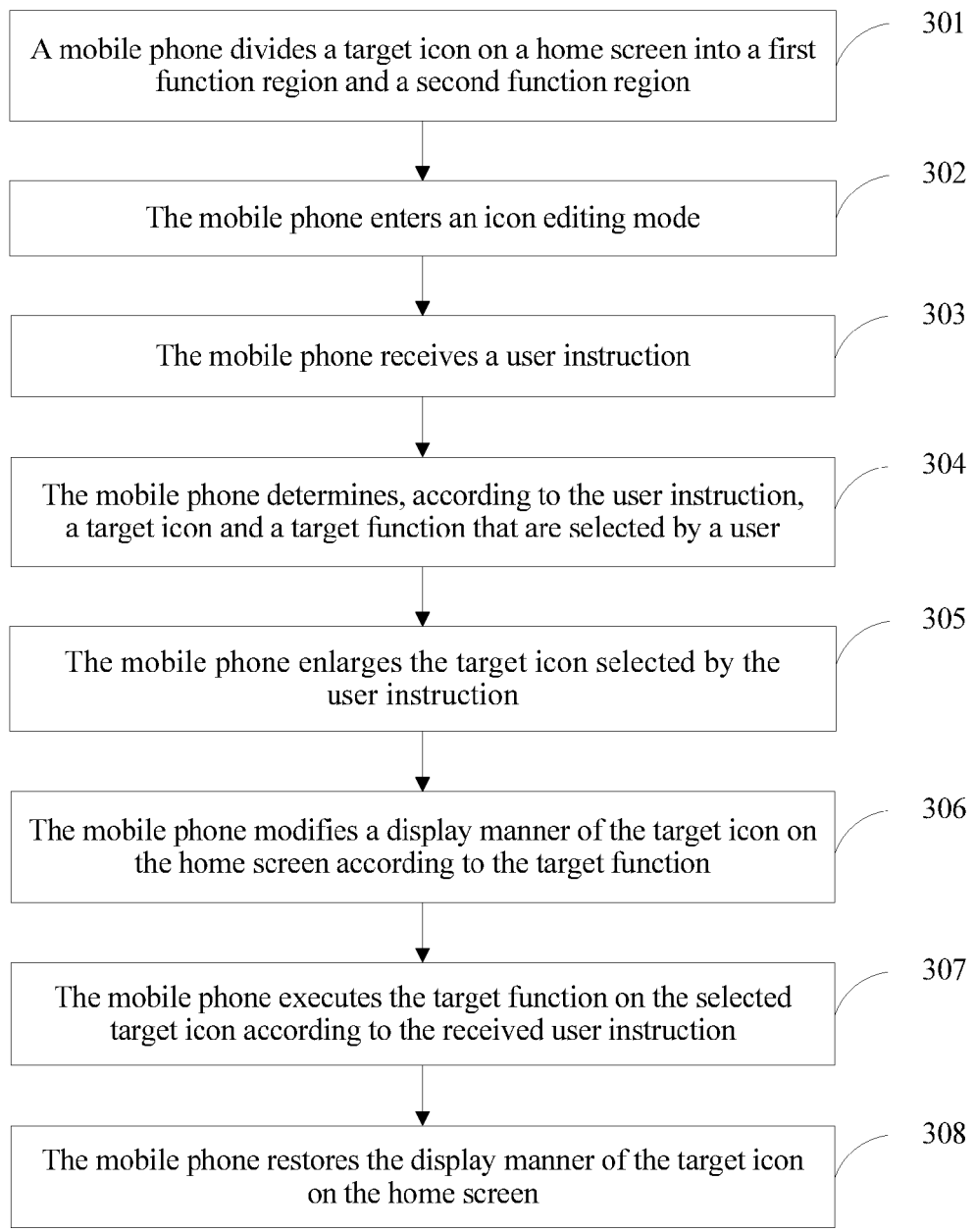
FIG. 4 is a flowchart of a method according to still another embodiment of the disclosure.

Still another embodiment of the disclosure provides an icon management method, and the method is applied to a terminal. A mobile phone with a touchscreen is used as an example. A home screen of the terminal includes at least one target icon. As shown in FIG. 4, the method includes the following steps:

301: A mobile phone divides a target icon on a home screen into a first function region and a second function region.

The first function region and the second function region do not overlap. Each function region divided by the mobile phone is corresponding to a different function. For example, the first function region is corresponding to three functions, which are A, B, and C respectively. A correspondence between the first function region and the three functions may be preset so that the correspondence between the first function region and the three functions is updated every five minutes, and an update sequence is A, B, and C. In this case, the correspondence between the first function region and the three functions is updated every five minutes according to the sequence A, B, and C. For another example, the first function region is corresponding to three functions, which are A, B, and C respectively. The mobile phone may count times that a user uses the three functions in a time period, and determine a correspondence between the first function region and the three functions according to the counted times. For another example, the first function region is corresponding to three functions, which are A, B, and C respectively. When an icon locates in an upper left corner of the home screen, the first function region is corresponding to the function A. When an icon locates in an upper right corner of the home screen, the first function region is corresponding to the function B. When an icon is not adjacent to any other icon on the screen, the function region is corresponding to the function C. For another example, a type of an icon is "game type", and the first function region is corresponding to two functions: folder combination and icon position adjustment. When a game type application folder already exists on the home screen, a function corresponding to the first function region is folder combination. When no game type application folder exists on the home screen, a function corresponding to the first function region is icon position adjustment.

Further, after dividing the function regions, the mobile phone may prompt, near each function region in a prompt box manner, a user about a function corresponding to each function region, so as to facilitate user selection.

It should be noted that a method for determining the correspondence between the foregoing function region and the foregoing functions is exemplary in this embodiment of the disclosure and is limited, and may include any implementable method.

In this embodiment of the disclosure, that the first function region is corresponding to a folder combination function, and the second function region is corresponding to an icon position adjustment function is used as an example.

It should be noted that the mobile phone divides an icon into at least two function regions. Two is used as an example for description in this embodiment of the disclosure. A method of obtaining a function region by division and a quantity of function regions may be preset. A manner of obtaining a region by division may be that a region is obtained by division according to a habit of a user, or may be obtained by equal or unequal division, which is not limited herein.

302: The mobile phone enters an icon editing mode.

A manner in which the mobile phone enters the icon editing mode is not limited, and may be any implementable manner. For example, the mobile phone enters the editing mode according to an operation of selecting an "edit" option by a user on a menu, or the mobile phone enters the editing mode by receiving an instruction of touching and holding an icon by a user, or the mobile phone enters the editing mode by receiving an instruction hovering over an icon from a user.

It should be noted that this step is an optional step, and may be not performed.

303: The mobile phone receives a user instruction.

A manner of implementing the user instruction is not limited. For example, a user may implement the instruction by tapping a target icon, or a user may implement the instruction by touching and holding an icon. The user instruction in this step is the first user instruction in the embodiment shown in FIG. 2.

304: The mobile phone determines, according to the user instruction, a target icon and a target function that are selected by a user.

The target icon selected by the user is an icon that the user wants to edit. The mobile phone determines, according to the user instruction, the target icon selected by the user, and may determine a function region of the selected target icon according to a position of the target icon selected by the user instruction, thereby further determining the target function according to a function corresponding to the selected function region, that is, a function that needs to be executed on the target icon. A manner in which the user selects the function region may be tapping a target region on an icon. The mobile phone determines, according to a function region in which a position tapped by the user is located, the function region selected by the user.

It should be noted that the user instruction is tapping the target icon on the home screen as an example. If a position tapped by the user on the target icon is located in a boundary line of a region, the function region selected by the user may be determined by determining a size of an area occupied in each region by the position tapped by the user on the icon. For example, a function region with a maximum occupied area is determined as the function region selected by the user, and if there is more than one function region with a maximum occupied area, the mobile phone may prompt the user for re-selection.

305: The mobile phone enlarges the target icon selected by the user instruction.

Figure 5:
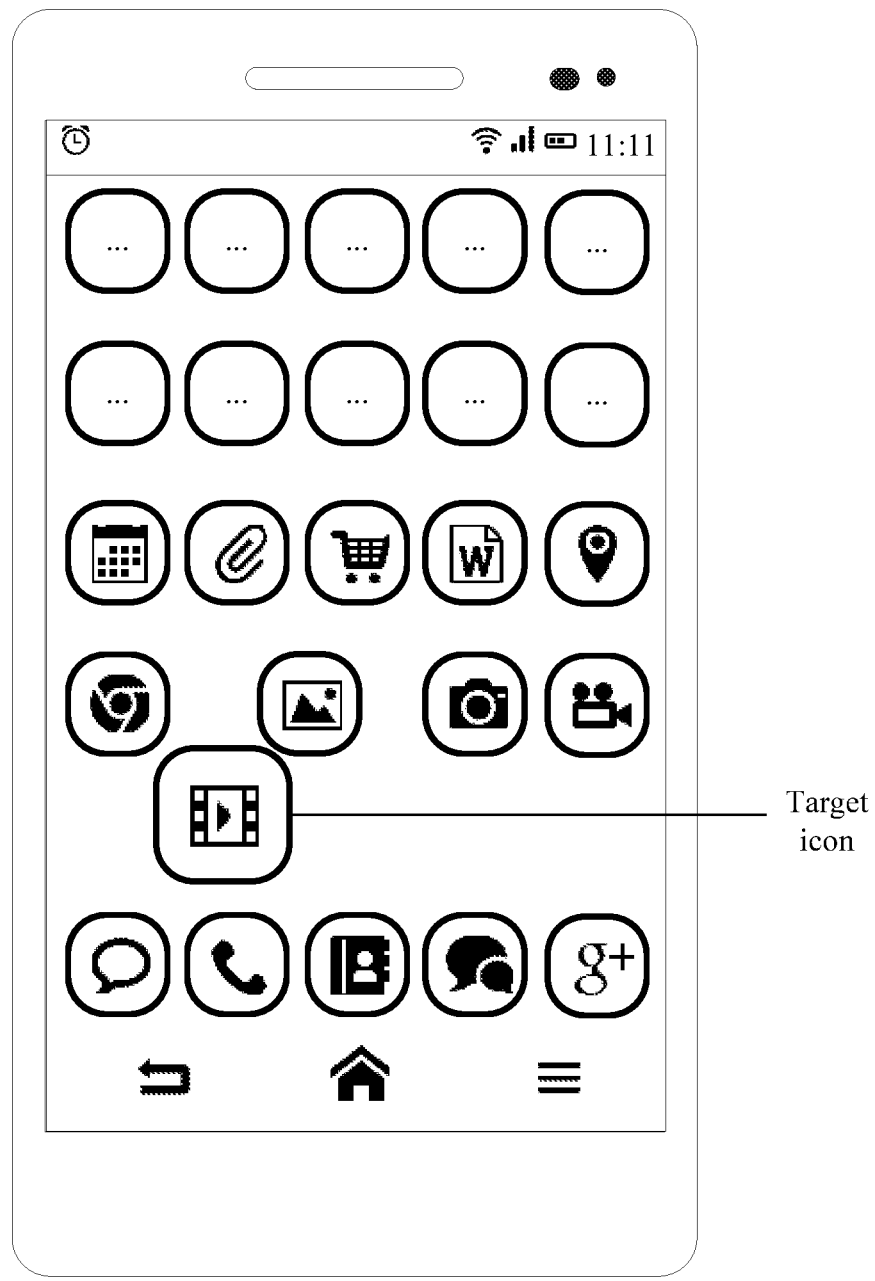
FIG. 5 is a schematic diagram of icon enlargement according to still another embodiment of the disclosure.

The enlargement of the target icon by the mobile phone may facilitate an operation of the user. A manner in which the mobile phone enlarges the target icon may be enlarging the target icon in an original position of the target icon, or may be enlarging the target icon in a vacant position of the screen on which the target icon is located. As shown in FIG. 5, FIG. 5 is a schematic diagram of enlarging a target icon in a vacant position of a screen.

It should be noted that step 305 is an optional step, and may be not performed.

306: The mobile phone modifies a display manner of the target icon on the home screen according to the target function.

The mobile phone modifies the display manner of the target icon on the home screen according to the target function, so as to prompt the user that the target function has been activated. In this case, the user can perform only target function adjustment on the target icon. A display manner of an icon on an interface in which the target icon modified by the mobile phone according to the target function is located may be set by the user or be set by a system. For example, when the target function is an icon combination operation, a shape of all icons on the interface is changed to a shape of a folder; or when the target function is an icon position adjustment operation, all icons on the interface are dithered.

Figure 6:
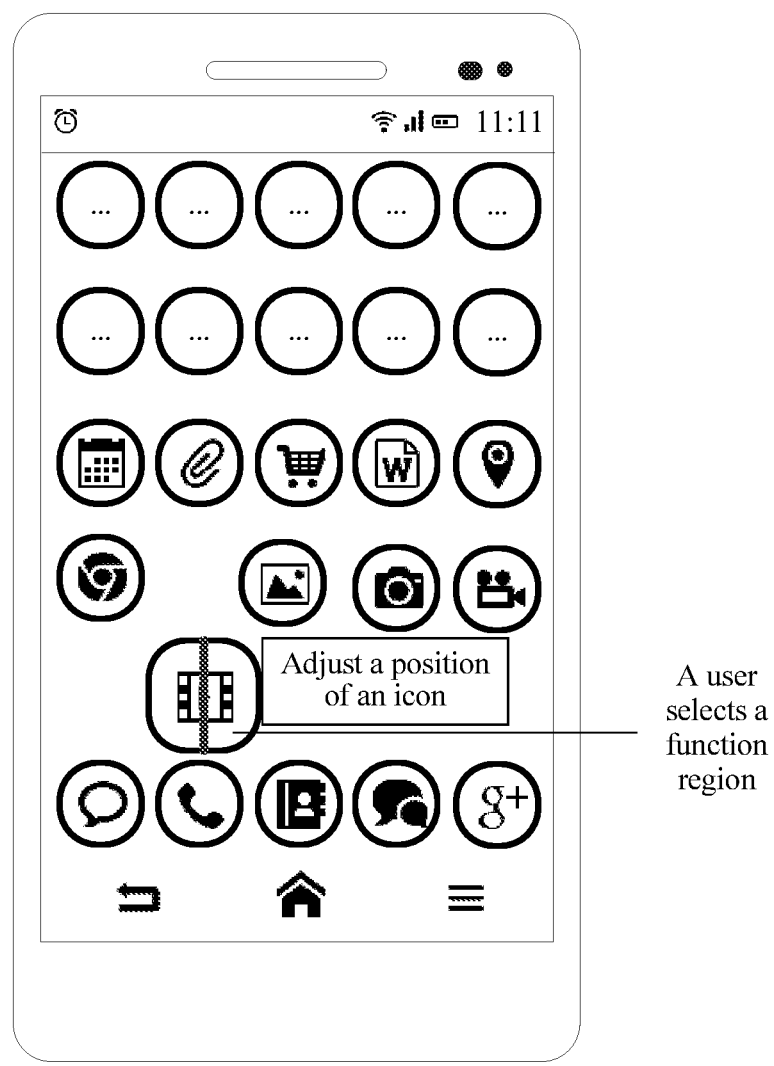
FIG. 6 is a schematic diagram of a function prompt according to still another embodiment of the disclosure.

Optionally, as shown in FIG. 6, when determining the target function corresponding to the function region selected by the user, the mobile phone may further prompt, in a prompt box manner, the user that only target function adjustment can be performed on the icon in this case.

307: The mobile phone executes the target function on the selected target icon according to the received user instruction.

For example, the user instruction received by the mobile phone is that the user selects the second function region of the target icon and drags the target icon to a vacant position. In this case, the mobile phone determines that the target function selected by the user is icon position adjustment. In this step, the mobile phone executes icon position adjustment on the selected target icon, that is, moves the selected target icon to the vacant position to which the user drags the target icon.

It should be noted that when the target function is some functions, for example, entering an icon combination mode, a function of entering the icon combination mode is executed in step 307. The terminal further receives a further instruction from the user subsequently, and combines the icon according to the further instruction of the user.

308: The mobile phone restores the display manner of the target icon on the home screen.

After performing step 307 to adjust the target icon, the mobile phone restores the display manner of the icon modified in step 306. For example, when the target function is the icon combination operation, the shape of the icon on the home screen is restored; when the target function is the icon position adjustment operation, dithering the icon on the home screen of the terminal is stopped.

Figure 7:
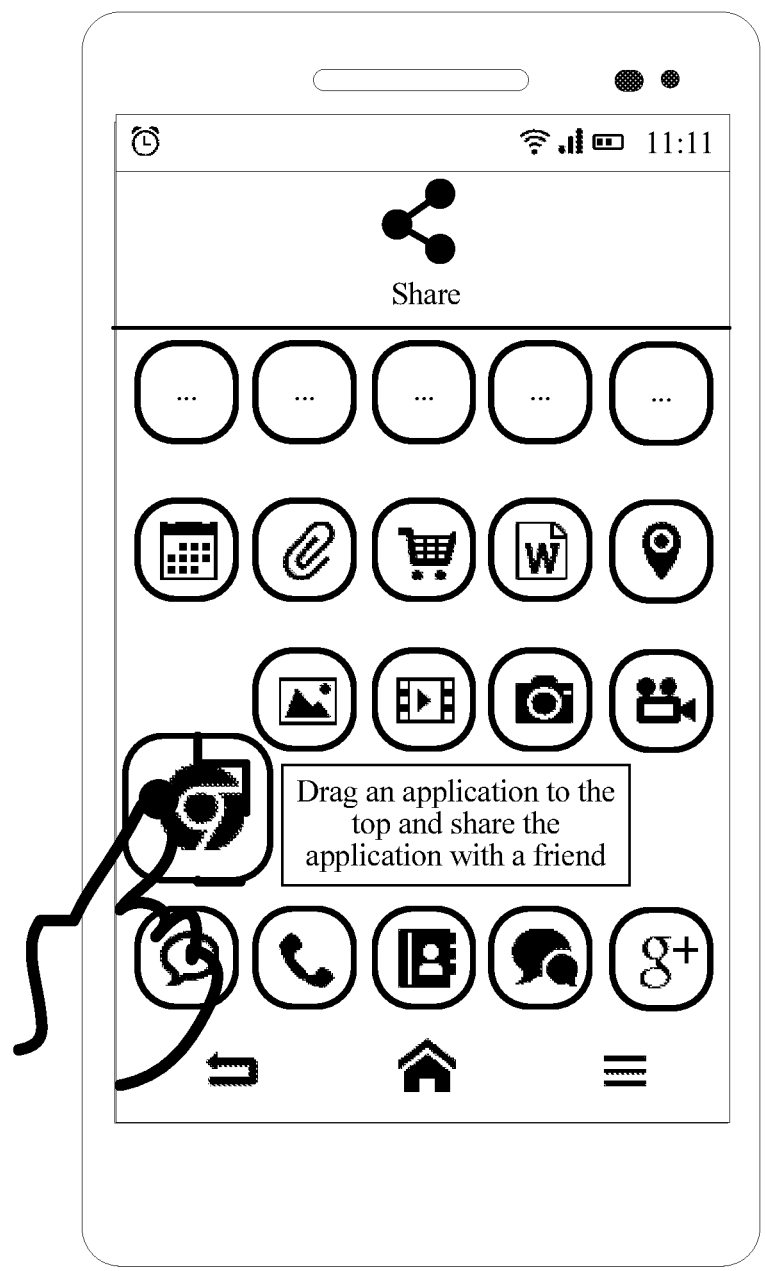
FIG. 7 and FIG. 8 are schematic diagrams of function prompts according to still another embodiment of the disclosure.
Figure 8:
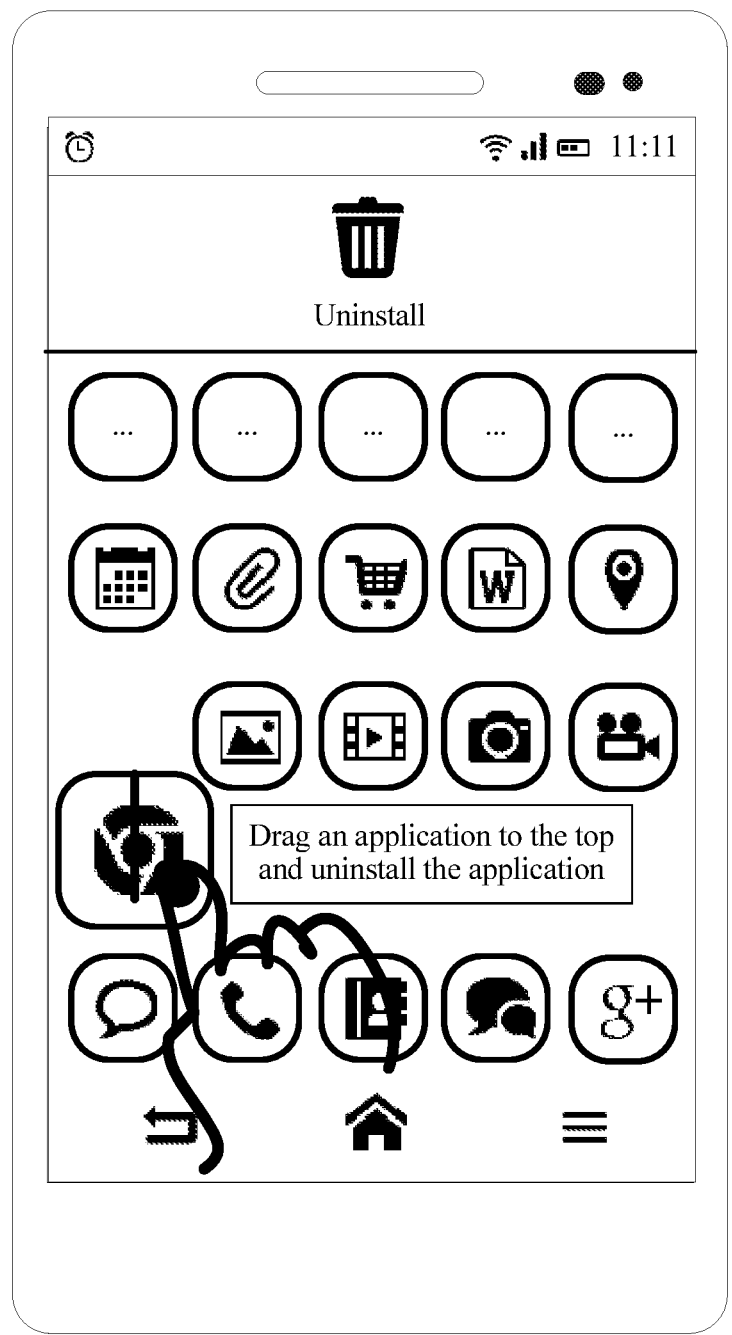

It should be noted that the first function region is corresponding to a folder combination function, and the second function region is corresponding to an icon position adjustment function as an example in this embodiment of the disclosure. However, the first function region and the second function region may be corresponding to other icon adjustment functions. For example, the first function region is corresponding to a friend sharing function, and the second function region is corresponding to an application uninstall function. In this case, when a user selects a function corresponding to the first function region, as shown in FIG. 7, a sharing button and a prompt box are displayed on the interface; when a user selects a function corresponding to the first function region, as shown in FIG. 8, an uninstall button and a prompt box are displayed on the interface.

In the prior art, a terminal adjusts an icon according to an operation of a user. However, some icon adjustment operations are similar. When a user executes an operation to adjust an icon, the terminal may incorrectly adjust the icon because of a misoperation, which not only wastes time of the user, but also lowers icon adjustment accuracy. Compared with the prior art, a mobile phone in the disclosure displays a home screen that includes at least one target icon, where the target icon has at least two non-overlapping function regions, and the function regions are corresponding to different icon adjustment functions; receives a first user instruction; determines a target icon selected by the first user instruction and a target function selected by the first user instruction, where the target function is a function corresponding to a function region of the target icon selected by the first user instruction; and executes the target function on the target icon selected by the first user instruction. In this way, the target icon on the home screen of the mobile phone includes at least two non-overlapping function regions, where the function regions are corresponding to different functions. When a user adjusts a target icon on the home screen, the mobile phone receives a user instruction for performing an operation on the target icon on the home screen from the user; determines, according to the user instruction, the target icon selected by the user and a function region of the target icon selected by the user; determines, according to the function region selected by the user and a function corresponding to the function region, a target function selected by the user; and executes the target function on the target icon selected by the user. Because the mobile phone executes only adjustment consistent with the target function on the target icon after determining the target function, the mobile phone executes no adjustment inconsistent with the target function on the target function, which reduces a misoperation that occurs when the terminal adjusts an icon, and improves icon adjustment accuracy.

Figure 9:
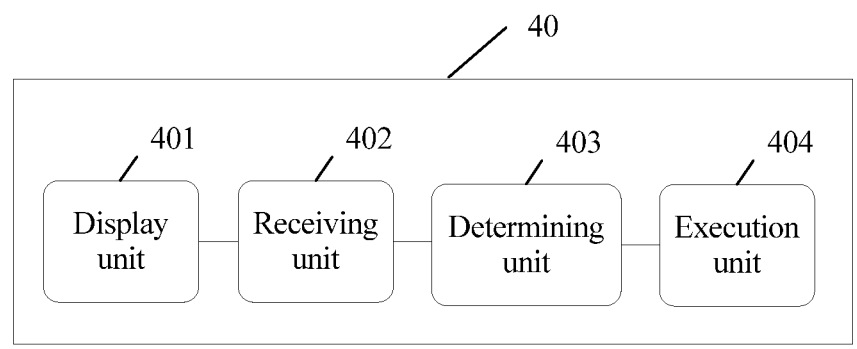
FIG. 9 and FIG. 10 are schematic structural diagrams of an apparatus according to still another embodiment of the disclosure.

Still another embodiment of the disclosure provides an icon management apparatus 40. As shown in FIG. 9, the apparatus 40 includes a display unit 401 configured to display a home screen, where the home screen includes at least one target icon, the target icon has at least two non-overlapping function regions, the function regions are corresponding to different functions, and the functions are icon adjustment functions; a receiving unit 402 configured to receive a first user instruction; a determining unit 403 configured to determine a target icon selected by the first user instruction and a target function selected by the first user instruction, where the target function is a function corresponding to a function region of the target icon selected by the first user instruction; and an execution unit 404 configured to execute the target function on the target icon selected by the first user instruction.

Figure 10:
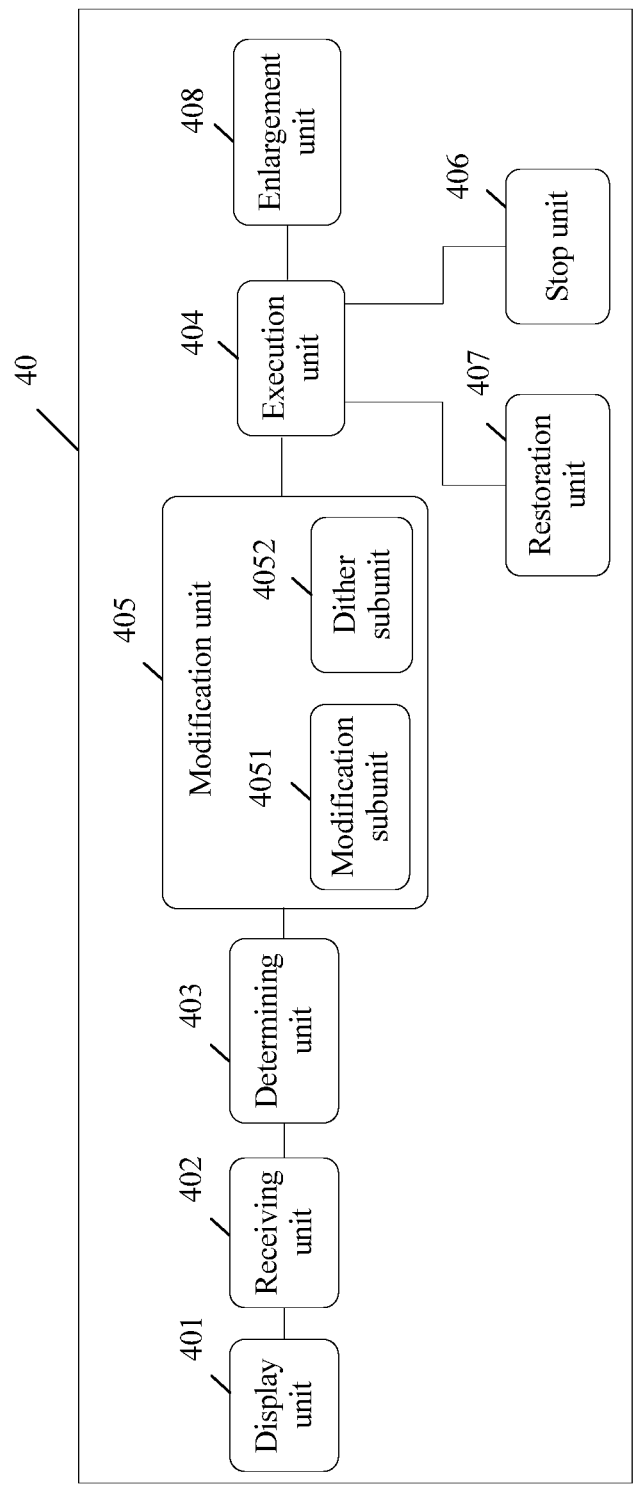

Optionally, as shown in FIG. 10, before executing the target function on the target icon selected by the first user instruction, the apparatus 40 may further include a modification unit 405 configured to modify a display manner of the target icon on the home screen according to the target function, so as to prompt that the target function is activated.

Further, as shown in FIG. 10, the target function is combining an icon or entering an icon combination mode, and the modification unit 405 may further include a modification subunit 4051 configured to, when the target function is combining the icon or entering the icon combination mode, modify a shape of the target icon on the home screen to a specific shape.

Further, as shown in FIG. 10, the target function is adjusting a position of an icon or entering an icon position adjustment mode, and the modification unit 405 may further include a dither subunit 4052 configured to, when the target function is adjusting the position of the icon or entering the icon position adjustment mode, dither the target icon on the home screen.

Optionally, the target function is entering the icon position adjustment mode, and after executing the target function on the target icon selected by the first user instruction, the receiving unit 402 is further configured to receive a second user instruction; and the execution unit 404 is further configured to execute a position adjustment function on a target icon selected by the second user instruction.

Optionally, as shown in FIG. 10, after executing a position adjustment function on a target icon selected by the second user instruction, the apparatus 40 may further include a stop unit 406 configured to stop dithering the target icon on the home screen.

Optionally, the target function is an operation of entering the icon combination mode, and the receiving unit 402 is further configured to receive a second user instruction; and the execution unit 404 is further configured to execute a position adjustment function on a target icon selected by the second user instruction.

Optionally, as shown in FIG. 10, after executing an icon combination function on a target icon selected by the second user instruction, the apparatus may further include a restoration unit 407 configured to restore the shape of the target icon on the home screen.

Optionally, the determining unit 403 is configured to, when a moment of receiving the first user instruction is in a different time period, determine that a different target function is selected by the first user instruction; or the determining unit 403 is configured to, when the target icon selected by the first user instruction is in a different position, determine that a different target function is selected by the first user instruction; or the determining unit 403 is configured to, when a type of the target icon selected by the first user instruction is a different type, determine that a different target function is selected by the first user instruction.

Optionally, the determining unit 403 is configured to, if the moment of receiving the first user instruction is in a first time period, determine that the target function selected by the first user instruction is a first function; or if the moment of receiving the first user instruction is in a second time period, determine that the target function selected by the first user instruction is a second function, where the first time period is different from the second time period, and the first function and the second function belong to the functions.

Optionally, the determining unit 403 is configured to, if the target icon selected by the first user instruction is in a first position, determine that the target function selected by the first user instruction is a first function; or if the target icon selected by the first user instruction is in a first position, determine that the target function selected by the first user instruction is a second function, where the first position is different from the second position, and the first function and the second function belong to the functions.

Optionally, the determining unit 403 is configured to, if the type of the target icon selected by the first user instruction is a first type, determine that the target function selected by the first user instruction is a first function; or if the type of the target icon selected by the first user instruction is a second type, determine that the target function selected by the first user instruction is a second function, where the first type is different from the second type, and the first function and the second function belong to the functions.

Optionally, as shown in FIG. 10, before executing the target function on the target icon selected by the first user instruction, the apparatus 40 may further include an enlargement unit 408 configured to enlarge, in a position of the target icon selected by the first user instruction, the target icon selected by the first user instruction; or the enlargement unit 408 is further configured to enlarge, in a vacant position of the home screen, the target icon selected by the first user instruction.

In the prior art, a terminal adjusts an icon according to an operation of a user. However, some icon adjustment operations are similar. When a user executes an operation to adjust an icon, the terminal may incorrectly adjust the icon because of a misoperation, which not only wastes time of the user, but also lowers icon adjustment accuracy. Compared with the prior art, the apparatus 40 in the disclosure displays a home screen that includes at least one target icon, where the target icon has at least two non-overlapping function regions, and the function regions correspond to different icon adjustment functions; receives a first user instruction; determines a target icon selected by the first user instruction and a target function selected by the first user instruction, where the target function is a function corresponding to a function region of the target icon selected by the first user instruction; and executes the target function on the target icon selected by the first user instruction. In this way, the target icon on the home screen of the apparatus 40 includes at least two non-overlapping function regions, where the function regions are corresponding to different functions. When a user adjusts a target icon on the home screen, the apparatus 40 receives a user instruction for performing an operation on the target icon on the home screen from the user; determines, according to the user instruction, the target icon selected by the user and a function region of the target icon selected by the user; determines, according to the function region selected by the user and a function corresponding to the function region, a target function selected by the user; and executes the target function on the target icon selected by the user. Because the apparatus 40 executes only adjustment consistent with the target function on the target icon after determining the target function, the apparatus 40 executes no adjustment inconsistent with the target function on the target function, which reduces a misoperation that occurs when the terminal adjusts an icon, and improves icon adjustment accuracy.

Figure 11:
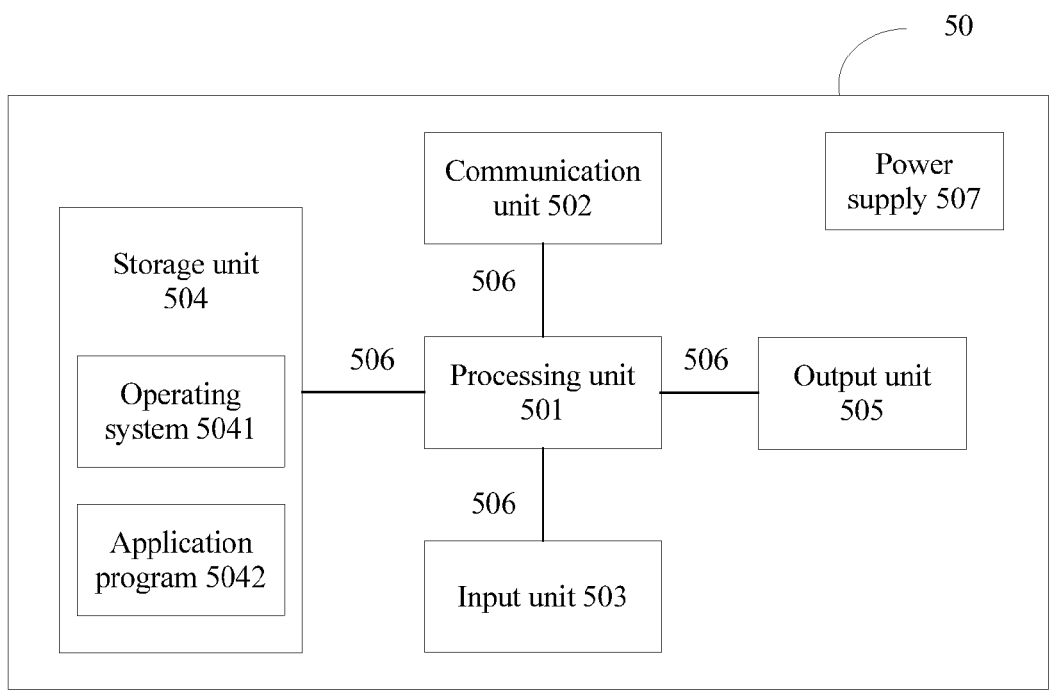
FIG. 11 is a schematic structural diagram of a terminal according to still another embodiment of the disclosure.

An embodiment of the disclosure further provides an icon management terminal 50. As shown in FIG. 11, a terminal 50 includes at least one processing unit 501, for example, a central processing unit (CPU), at least one communication unit 502 or another input unit 503, a storage unit 504, an output unit 505, at least one communications bus 506, and a power supply 507. The communications bus 506 is configured to implement communication between these components.

The processing unit 501 is a control center of the terminal 50, is connected to each part of the entire terminal 50 by using various interfaces and lines, and executes various functions of the terminal 50 and/or processes data by running or executing a software program and/or a module that are/is stored in a storage unit and by invoking data stored in the storage unit 504. The processing unit 501 may be constituted by an integrated circuit (IC), for example, may be constituted by a single packaged IC, or may be constituted by multiple packaged ICs that are connected and have a same function or different functions. For example, the processing unit 501 may include only a (CPU), or may be a combination of a graphics processing unit (GPU), a digital signal processor (DSP), and a control chip (for example, a baseband chip) in a communication unit. In this implementation manner of the disclosure, the CPU may be a single computing core, or may include multiple computing cores.

The communication unit 502 is configured to establish a communication channel, so that the terminal 50 is connected to a remote server by using the communication channel, and downloads media data from the remote server, or uploads media data to the remote server. The communication unit 502 may include a communication module such as a wireless local area network (wireless LAN) module, a Bluetooth® module, or a base band module, and a radio frequency (RF) circuit corresponding to the communication module, so as to perform wireless local area network communication, Bluetooth communication, infrared ray communication and/or cellular communications system communication, for example, wideband code division multiple access (W-CDMA) and/or high speed downlink packet access (HSDPA). The communication module is configured to control communication between all components in the terminal 50, and may support direct memory access (DMA).

In different implementation manners of the disclosure, each communication module in the communication unit 502 generally appears in a form of an IC chip, and may be combined selectively without a need of including all communication modules and corresponding antenna groups. For example, the communication unit 502 may include only a baseband chip, an RF chip, and a corresponding antenna, so as to provide a communication function in a cellular communications system. The terminal 50 may connect to a cellular network or the Internet by using a wireless communication connection established by the communication unit 502, for example, wireless LAN access or W-CDMA access. In some optional implementation manners of the disclosure, a communication module in the communication unit 502, for example, the baseband module, may be integrated into the processing unit 501.

The input unit 503 is configured to implement interaction between a user and the terminal 50 and/or information input to the terminal 50. For example, the input unit 503 may receive digit or character information inputted by the user, so as to generate signal input related to user settings or function control. In a specific implementation manner of the disclosure, the input unit 503 may be a touch panel, may be another human-computer interaction interface, for example, a substantive input key or a microphone; or may be another external information acquiring apparatus, for example, a camera. The touch panel is also referred to as a touchscreen or a touch-controlled screen, and may collect an operation action of touching or approaching performed by the user on the touch panel, for example, an operation action performed by the user on the touch panel or in a position close to the touch panel by using any proper object or accessory such as a finger or a stylus, and a corresponding connecting apparatus is driven according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into touch point coordinates, and then transmits the touch point coordinates to the processing unit 501. The touch controller may further receive and execute a command sent from the processing unit 501. In addition, the touch panel may be implemented by using multiple types such as a resistive type, a capacitive type, an infrared ray, and a surface acoustic wave. In another implementation manner of the disclosure, the substantive input key used by the input unit 503 may include but is not limited to one or more of a physical keyboard, a function key (for example, a volume control key or an on/off key), a trackball, a mouse, an operating lever, or the like. The input unit 503 in a form of a microphone may collect a voice inputted by the user or an environment, and convert the voice into a command that is in a form of an electric signal and may be executed by the processing unit 501.

The storage unit 504 is configured to store a software program and a module, and the processing unit 501 runs the software program and the module that are stored in the storage unit 504 to execute various function applications of the terminal 50 and implement data processing. The storage unit 504 mainly includes a program storage area and a data storage area. The program storage area may store an operating system 5041, an application program 5042 used by at least one function, for example, a sound play program or an image play program. The data storage area may store data (such as audio data or a phonebook) and the like that are created according to use of the terminal 50. In a specific implementation manner of the disclosure, the storage unit 504 may include a volatile memory such as a nonvolatile random-access memory (NVRAM), a phase change random-access memory (PRAM), or a magnetoresistive RAM (MRAM), and may further include a nonvolatile memory such as at least one magnetic disk storage component, an electrically erasable programmable read-only memory (EEPROM), or a flash memory component, for example, a not OR flash memory (NOR flash memory) or a not AND flash memory (NAND flash memory). The nonvolatile memory stores the operating system 5041 and the application program 5042 that are executed by the processing unit 501. The processing unit 501 loads, from the nonvolatile memory, a running program and data to a memory, and stores digital content in a mass storage apparatus. The operating system

5041 includes various components and/or drivers that are configured to control and manage a regular system task such as memory management, storage device control, or power management, and facilitate communication between various software and hardware. In this implementation manner of the disclosure, the operating system may be an Android operating system (Android OS), an iOS (formerly iPhone® operating system), or a Windows operating system, or may be an embedded operating system such as Vxworks®.

The application program 5042 includes any application installed on the terminal 50, and includes but is not limited to a browser, an email, an instant message service, word processing, a virtual keyboard, a window widget, encryption, digital copyright management, voice recognition, voice duplication, positioning (for example, a function provided by a Global Positioning System (GPS)), music play, or the like.

The output unit 506 includes but is not limited to an image output unit and a sound output unit. The image output unit is configured to output a character, a picture, and/or a video. The image output unit may include a display panel, for example, a display panel configured in a form of an liquid crystal display (LCD), an organic light-emitting diode (OLED), a field emission display (FED), or the like. Alternatively, the image output unit may include a reflective display, for example, an electrophoretic display or a display using an interferometric modulation of light technology. The image output unit may include a single display or multiple displays of different sizes. In a specific implementation manner of the disclosure, the touch panel used by the foregoing input unit 503 may be simultaneously used as the display panel of the output unit 506. For example, after detecting a gesture operation of touching or approaching on the touch panel, the touch panel transmits the gesture operation to the processing unit 501, so as to determine a type of a touch event, and then the processing unit 501 provides corresponding visual output on the display panel according to the type of the touch event. The input unit 503 and the output unit 506 may serve as two independent parts to implement input and output functions of the terminal 50. However, in some embodiments, the touch panel and the display panel may be integrated to implement the input and output functions of the terminal 50. For example, the image output unit may display various graphical user interfaces (GUI), including but not limited to a window, a scrollbar, an icon, and a scrapbook, and use the GUIs as virtual control components, so that a user performs an operation in a touch manner.

An audio output unit includes a digital-to-analog converter and is configured to convert an audio signal output by the processing unit 501 from a digital format into an analog format.

The power supply 507 is configured to supply power to various parts of the terminal 50 to maintain their running. Generally, the power supply 507 may be a built-in battery such as a common lithium-ion (Li-ion) battery or a nickel-hydride battery, and may also include an external power supply that directly supplies power to the terminal 50, such as an alternating current (AC) adapter. In some implementation manners of the disclosure, the power supply 507 may further have a wider definition. For example, the power supply 507 may further include a power management system, a charging system, a power fault detection circuit, a power converter or inverter, a power status indicator (for example, a LED), and any other component related to power generation, management, and distribution of the terminal 50.

Specifically, the output unit 505 is configured to display a home screen, where the home screen includes at least one target icon, the target icon has at least two non-overlapping function regions, the function regions are corresponding to different functions, and the functions are icon adjustment functions; the input unit 503 is configured to receive a first user instruction; and the processing unit 501 is configured to determine a target icon selected by the first user instruction and a target function selected by the first user instruction, where the target function is a function corresponding to a function region of the target icon selected by the first user instruction; and execute the target function on the target icon selected by the first user instruction.

Optionally, the processing unit 501 is further configured to, before executing the target function on the target icon selected by the first user instruction, modify a display manner of the target icon on the home screen according to the target function, so as to prompt that the target function is activated.

Further, the target function is combining an icon or entering an icon combination mode, and modifying a display manner of the target icon on the home screen according to the target function includes modifying a shape of the target icon on the home screen to a specific shape.

Further, the target function is adjusting a position of an icon or entering an icon position adjustment mode, and modifying a display manner of the target icon on the home screen according to the target function includes dithering the target icon on the home screen.

Optionally, the target function is entering the icon position adjustment mode, and the input unit 503 is further configured to receive a second user instruction, after executing the target function on the target icon selected by the first user instruction; and the processing unit 502 is further configured to execute a position adjustment function on a target icon selected by the second user instruction.

Further, the processing unit 501 is further configured to, after executing a position adjustment function on a target icon selected by the second user instruction, stop dithering the target icon on the home screen.

Optionally, the target function is an operation of entering the icon combination mode, and the input unit 503 is further configured to receive a second user instruction after executing the target function on the target icon selected by the first user instruction; and the processing unit 501 is further configured to execute a position adjustment function on a target icon selected by the second user instruction.

Further, the processing unit 501 is further configured to, after executing an icon combination function on a target icon selected by the second user instruction, restore the shape of the target icon on the home screen.

Optionally, the processing unit 501 is further configured to, determine, when a moment of receiving the first user instruction is in a different time period, that a different target function is selected by the first user instruction; or determine, when the target icon selected by the first user instruction is in a different position, that a different target function is selected by the first user instruction; or determine, when a type of the target icon selected by the first user instruction is a different type, that a different target function is selected by the first user instruction.

Optionally, determining, when a moment of receiving the first user instruction is in a different time period, that a different target function is selected by the first user instruction includes, if the moment of receiving the first user instruction is in a first time period, determining that the target function selected by the first user instruction is a first function; or if the moment of receiving the first user instruction is in a second time period, determining that the target function selected by the first user instruction is a second function, where the first time period is different from the second time period, and the first function and the second function belong to the functions.

Optionally, determining, when the target icon selected by the first user instruction is in a different position, that a different target function is selected by the first user instruction includes, if the target icon selected by the first user instruction is in a first position, determining that the target function selected by the first user instruction is a first function; or if the target icon selected by the first user instruction is in a first position, determining that the target function selected by the first user instruction is a second function, where the first position is different from the second position, and the first function and the second function belong to the functions.

Optionally, determining, when a type of the target icon selected by the first user instruction is a different type, that a different target function is selected by the first user instruction includes, if the type of the target icon selected by the first user instruction is a first type, determining that the target function selected by the first user instruction is a first function; or if the type of the target icon selected by the first user instruction is a second type, determining that the target function selected by the first user instruction is a second function, where the first type is different from the second type, and the first function and the second function belong to the functions.

Optionally, the processing unit 501 is further configured to, before executing the target function on the target icon selected by the first user instruction, enlarge, in a position of the target icon selected by the first user instruction, the target icon selected by the first user instruction; or enlarge, in a vacant position of the home screen, the target icon selected by the first user instruction.

In the prior art, a terminal adjusts an icon according to an operation of a user. However, some icon adjustment operations are similar. When a user executes an operation to adjust an icon, the terminal may incorrectly adjust the icon because of a misoperation, which not only wastes time of the user, but also lowers icon adjustment accuracy. Compared with the prior art, the terminal 50 in the disclosure displays a home screen that includes at least one target icon, where the target icon has at least two non-overlapping function regions, and the function regions are corresponding to different icon adjustment functions; receives a first user instruction; determines a target icon selected by the first user instruction and a target function selected by the first user instruction, where the target function is a function corresponding to a function region of the target icon selected by the first user instruction; and executes the target function on the target icon selected by the first user instruction. In this way, the target icon on the home screen of the terminal 50 includes at least two non-overlapping function regions, where the function regions are corresponding to different functions. When a user adjusts a target icon on the home screen, the terminal 50 receives a user instruction for performing an operation on the target icon on the home screen from the user; determines, according to the user instruction, the target icon selected by the user and a function region of the target icon selected by the user; determines, according to the function region selected by the user and a function corresponding to the function region, a target function selected by the user; and executes the target function on the target icon selected by the user. Because the terminal 50 executes only adjustment consistent with the target function on the target icon after determining the target function, the terminal 50 executes no adjustment inconsistent with the target function on the target function, which reduces a misoperation that occurs when the terminal adjusts an icon, and improves icon adjustment accuracy.

The icon management apparatus provided in the embodiments of the disclosure may implement the foregoing provided method embodiments, and for detailed function implementation, reference may be made to descriptions in the method embodiments, and details are not described herein. The icon management method and apparatus that are provided in the embodiments of the disclosure may be applicable to a terminal, but is not limited herein.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a ROM, or a RAM.

The foregoing descriptions are merely specific embodiments of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. An icon management method implemented by a terminal, the method comprising:
    setting, on a target icon of at least one target icon, different icon functions on the target icon according to a location of the target icon on a home screen and a proximity of the target icon to other target icons on the home screen;
    displaying the home screen comprising the at least one target icon, wherein the target icon comprises at least two non-overlapping function regions wherein the non-overlapping function regions comprise the different icon functions, wherein the target icon comprises the icon function of the different icon functions and wherein the target icon is located at the location on the home screen, wherein the terminal comprises the home screen, and wherein the different icon functions comprise:
        a first type of icon function that is different than an icon function of a first adjacent target icon based on:
            a first location of the target icon; and
            an adjacent position of the target icon to the first adjacent target icon, wherein the first type of icon function belongs to the target icon;
        a second type of icon function that is different than an icon function of a second adjacent target icon based on:
            a second location of the target icon; and
            an adjacent position of the target icon to the second adjacent target icon, wherein the second type of icon function belongs to the target icon; and a third type of icon function based on:
the first location or the second location; and
the target icon not in an adjacent position to the other target icons, wherein the third type of icon function belongs to the target icon, wherein each type of icon function of the first type of icon function, the second type of icon function, and the third type of icon function is different, wherein each location of the first location, and the second location is different, and wherein each of the first type of icon function, the second of icon function, and the third type of icon function belong to the target function;
receiving a first user instruction;
selecting, using the first user instruction, the target icon;
obtaining each of a selected target icon and a target non-overlapping function region from the non-overlapping function regions based on the selecting;
determining a target icon function of the icon functions corresponding to the target non-overlapping function region according to the location and the proximity of the target icon to other target icons on the home screen; and
executing the target icon function on the selected target icon.

2. The icon management method of claim 1, wherein the different functions comprise icon adjustment functions, and wherein the method further comprises prompting the terminal to activate the target icon adjustment function by modifying a display manner of the selected target icon on the home screen according to the target icon function before executing the target icon function on the selected target icon.

3. The icon management method of claim 2, wherein executing the target icon function comprises combining an icon with another icon or entering an icon combination mode, and wherein modifying the display manner of the selected target icon on the home screen comprises modifying a shape of the selected target icon on the home screen to a specific shape.

4. The icon management method of claim 3, wherein executing the target icon function comprises entering the icon combination mode, and wherein after executing the target icon function on the selected target icon, the method further comprises:
receiving a second user instruction;
selecting, using the second user instruction, a second target icon; and
executing an icon combination function on a selected second target icon.

5. The icon management method of claim 4, further comprising restoring the shape of the selected target icon on the home screen after executing the icon combination function on the selected second target icon.

6. The icon management method of claim 2, wherein executing the target icon function comprises adjusting a position of an icon or entering an icon position adjustment mode, and wherein modifying the display manner of the selected target icon on the home screen comprises dithering the selected target icon on the home screen.

7. The icon management method of claim 6, wherein determining executing the target icon function comprises entering the icon position adjustment mode, and wherein after executing the target icon function on the selected target icon, the method further comprises:
receiving a second user instruction;
selecting, using the second user instruction, a second target icon; and
executing a position function on a selected second target icon.

8. The icon management method of claim 7, further comprising stopping dithering of the selected target icon on the home screen after executing the position function on the selected second target icon.

9. The icon management method of claim 1, wherein the different functions comprise icon adjustment functions, and wherein determining the target icon function comprises:
determining that a first different target icon function is selected by the first user instruction when a moment of receiving the first user instruction is in a different time period;
determining that a second different target icon function is selected by the first user instruction when the selected target icon is in a different position; and
determining that a third different target icon function is selected by the first user instruction when a type of the selected target icon is a different type.

10. The icon management method of claim 9, wherein determining that the first different target icon function is selected by the first user instruction comprises:
determining that the target icon function selected by the first user instruction is a first icon function when the moment of receiving the first user instruction is in a first time period; and
determining that the target icon function selected by the first user instruction is a second icon function when the moment of receiving the first user instruction is in a second time period, wherein the first time period is different from the second time period, and wherein the first icon function and the second icon function belong to the non-overlapping function regions.

11. The icon management method of claim 9, wherein determining that the second different target icon function is selected by the first user instruction comprises:
determining that the target icon function selected by the first user instruction is a first icon function when the selected target icon is in a first position; and
determining that the target icon function selected by the first user instruction is a second icon function when the selected target icon is in a second position, wherein the first position is different from the second position, and wherein the first icon function and the second icon function belong to the non-overlapping function regions.

12. The icon management method of claim 9, wherein determining that the third different target icon function is selected by the first user instruction comprises:
determining that the target icon function selected by the first user instruction is a first icon function when the type of the selected target icon is a first type; and
determining that the target icon function selected by the first user instruction is a second icon function when the type of the selected target icon is a second type, wherein the first type is different from the second type, and wherein the first icon function and the second icon function belong to the non-overlapping function regions.

13. The icon management method of claim 1, wherein the different functions comprise icon adjustment functions, wherein before executing the target icon function on the selected target icon, the method further comprises:
enlarging the selected target icon in a position of the selected target icon; or enlarging the selected target icon in a vacant position of the home screen.

14. A terminal, comprising:
a processor configured to:
    set, on a target icon of at least one target icon, different icon functions on the target icon according to a location of the target icon on a home screen and a proximity of the target icon to other target icons on the home screen, wherein the different icon functions comprise:
        a first type of icon function that is different than an icon function of a first adjacent target icon based on:
            a first location of the target icon; and
            an adjacent position of the target icon to the first adjacent target icon, wherein the first type of icon function belongs to the target icon;
        a second type of icon function that is different than an icon function of a second adjacent target icon based on:
            a second location of the target icon; and
            an adjacent position of the target icon to the second adjacent target icon, wherein the second type of icon function belongs to the target icon; and
        a third type of icon function based on:
            either the first location or the second location; and
            the target icon not in an adjacent position to the other target icons,
        wherein the third type of icon function belongs to the target icon, wherein each type of icon function of the first type of icon function, the second type of icon function, and the third type of icon function is different, wherein each location of the first location, and the second location is different, and wherein each of the first type of icon function, the second of icon function, and the third type of icon function belong to the target function;
an output device coupled to the processor and configured to display the home screen, wherein the home screen comprises the target icon, wherein the target icon comprises at least two non-overlapping function regions, wherein the non-overlapping function regions comprise the different icon functions, wherein the target icon comprises the icon function of the different icon functions and wherein the target icon is located at the location on the home screen;
an input device coupled to the processor and the output device and configured to receive a first user instruction, wherein the processor is configured to use the first user instruction to:
    select each of the target icon to obtain a selected target icon and a target non-overlapping function region from the non-overlapping function regions;
    determine a target icon function of the icon functions corresponding to the target non-overlapping function region; and
    execute the target icon function on the selected target icon.

15. The terminal of claim 14, wherein the processor is further configured to modify a display manner of the selected target icon on the home screen according to the target icon function before executing the target icon function on the selected target icon.

16. The terminal of claim 15, wherein the processor is configured to:
execute the target icon function by combining an icon with another icon or entering an icon combination mode; and
modify the display manner of the selected target icon by modifying a shape of the selected target icon on the home screen to a specific shape.

17. The terminal of claim 15, wherein the processor is configured to:
execute the target icon function by adjusting a position of an icon or entering an icon position adjustment mode; and
modify the display manner of the target icon on the home screen by dithering the selected target icon on the home screen.

18. The terminal of claim 15, wherein the processor is configured to:
execute the target icon function by entering an icon position adjustment mode;
receive a second user instruction after executing the target icon function on the selected target icon;
select a second target icon using the second user instruction; and
execute a position function on a selected second target icon.

19. The terminal of claim 18, wherein the processor is further configured to stop dithering the selected target icon on the home screen after executing the position function on the selected second target icon.

20. The terminal of claim 18, wherein the processor is configured to execute the target icon function by an operation of entering an icon combination mode, wherein the input device is further configured to receive the second user instruction after executing the target icon function on the target icon, and wherein the processor is further configured to execute the position adjustment function on the selected second target icon.

* * * * *

UNITED STATES PATENT AND TRADEMARK OFFICE
CERTIFICATE OF CORRECTION

PATENT NO. : 10,509,551 B2
APPLICATION NO. : 15/526833
DATED : December 17, 2019
INVENTOR(S) : Xi Huang et al.

It is certified that error appears in the above-identified patent and that said Letters Patent is hereby corrected as shown below:

On the Title Page

Item [30], "2017 1 0657871" should read "2014 1 0657871.0"

In the Claims

Claim 7, Column 25, Line 61: "determining executing the target" should read "executing the target"

Claim 7, Column 26, Line 1: "position function" should read "position adjustment function"

Claim 8, Column 26, Line 5: "position function" should read "position adjustment function"

Claim 14, Column 27, Line 47: "icon functions and" should read "icon functions, and"

Claim 18, Column 28, Line 38: "position function" should read "position adjustment function"

Claim 19, Column 28, Line 42: "position function" should read "position adjustment function"

Signed and Sealed this
Fourth Day of February, 2020

Andrei Iancu
*Director of the United States Patent and Trademark Office*